United States Patent
Hu et al.

(10) Patent No.: US 9,520,622 B2
(45) Date of Patent: Dec. 13, 2016

(54) DETECTION DEVICE FOR LITHIUM-ION BATTERY

(71) Applicant: Ningde Amperex Technology Limited, Ningde (CN)

(72) Inventors: Junzhong Hu, Ningde (CN); Chengyou Xing, Ningde (CN); Pinghua Deng, Ningde (CN); Yanhua Lu, Ningde (CN); Xiaolei Liu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 471 days.

(21) Appl. No.: 14/147,465

(22) Filed: Jan. 3, 2014

(65) Prior Publication Data

US 2014/0191763 A1 Jul. 10, 2014

(30) Foreign Application Priority Data

Jan. 10, 2013 (CN) ...................... 2013 2 0012596 U

(51) Int. Cl.
*G01N 27/416* (2006.01)
*H01M 10/42* (2006.01)

(52) U.S. Cl.
CPC ................ *H01M 10/4285* (2013.01)

(58) Field of Classification Search
USPC ........................................ 324/426
See application file for complete search history.

(56) References Cited

U.S. PATENT DOCUMENTS

| 7,740,962 | B2* | 6/2010 | Lewinski | ............ | H01M 8/0247 |
| | | | | | 429/437 |
| 2004/0021442 | A1* | 2/2004 | Higashino | ......... | H01M 10/0413 |
| | | | | | 320/112 |

* cited by examiner

*Primary Examiner* — Robert Grant
(74) *Attorney, Agent, or Firm* — Morgan, Lewis & Bockius LLP

(57) ABSTRACT

The present disclosure provides a detection device for lithium-ion battery, which comprises an insulative housing having a receiving chamber; an insulative separator positioned between the positive electrode sheet and the negative electrode sheet when the positive electrode sheet and the negative electrode sheet are received in the receiving chamber; a positive electrode sheet conductive fastener passing through the insulative housing and fixedly connected to a positive electrode current collector at a positive electrode current collector non-film-coating region; a negative electrode sheet conductive fastener passing through the insulative housing and fixedly connected to a negative electrode current collector at a negative electrode current collector non-film-coating region; an insulative cover engaged with the insulative housing and the insulative separator; a positive electrode region detection hole communicated to the positive electrode sheet gas region; and a negative electrode region detection hole communicated to the negative electrode sheet gas region.

11 Claims, 4 Drawing Sheets

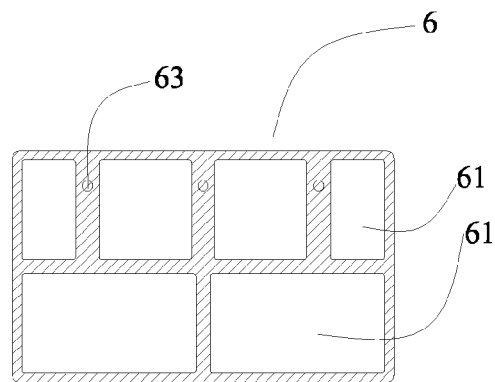
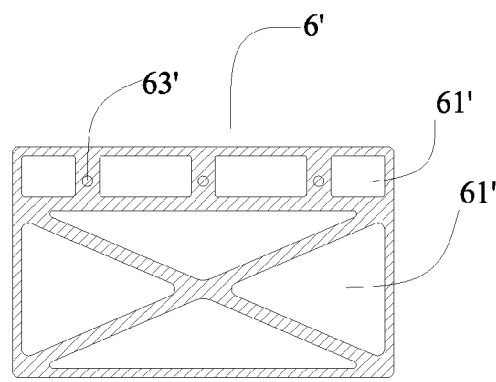
FIG.8  FIG.9
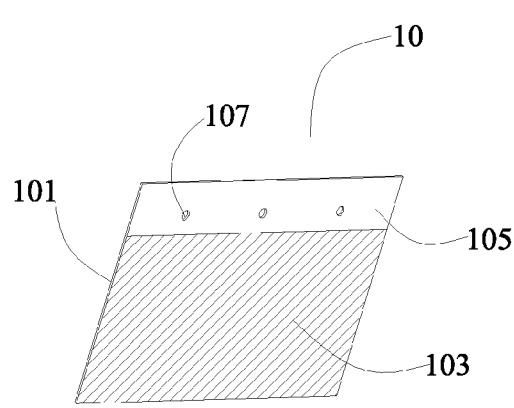
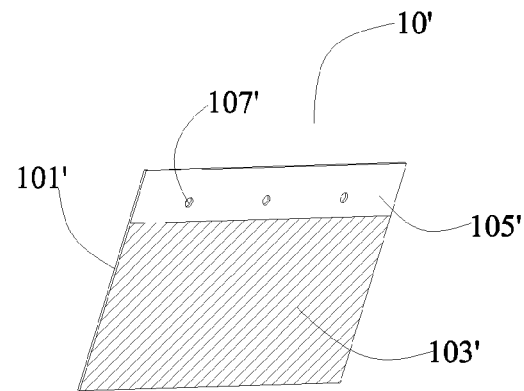
FIG.10  FIG.11

US 9,520,622 B2

DETECTION DEVICE FOR LITHIUM-ION BATTERY

REFERENCE TO RELATED APPLICATIONS

The present disclosure claims priority to Chinese Patent Application No. CN 201320012596.8 filed on Jan. 10, 2013, the content of which is fully incorporated in its entirety herein.

FIELD OF THE PRESENT DISCLOSURE

The present disclosure relates to technical field of lithium-ion batteries, and particularly relates to a detection device for lithium-ion battery.

BACKGROUND OF THE PRESENT DISCLOSURE

At present, there are two kinds of detection devices for lithium-ion battery, one kind is used for testing a lithium-ion battery after packaging, such as a technology disclosed by Chinese utility model patent CN201476992U issued on May 19, 2010, which adopted a battery clamp and a sampling needle for testing, but as the technology tested a sample after packaging, the technology has a high cost, and does not facilitate to test under various experimental conditions.

The other kind is used for testing a non-packaging component especially an electrode sheet, and generally the electrode sheet is positioned in a sealed beaker or glassware to observe a state of the electrode sheet during a charging/discharging process. But as the electrode sheet is not fixed therein, floatation of the electrode sheet is easily caused. In addition, when testing, the electrode sheet with a very small area ($\approx 1$ cm$^2$) is generally selected to perform the testing, so it is inconvenient to connect the electrode sheet to a power line, at the same time, because of the small area, testing is inconvenient, so as to cause a relative large error of testing on analysis of produced gas and heat.

SUMMARY OF THE PRESENT DISCLOSURE

In view of the problem existing in the background of the present disclosure, an object of the present disclosure is to provide a detection device for lithium-ion battery, which can be flexibly applied to detection under various conditions.

Another object of the present disclosure is to provide a detection device for lithium-ion battery, which can perform testing on a non-packaging component, and can ensure convenience of testing and accuracy of testing result.

In order to achieve the above objects, the present disclosure provides a detection device for lithium-ion battery, which comprises: an insulative housing having a receiving chamber for receiving a positive electrode sheet, a negative electrode sheet, and an electrolyte of a lithium-ion battery, the receiving chamber comprises a positive electrode sheet gas region and a negative electrode sheet gas region formed above the electrolyte; an insulative separator provided in the receiving chamber of the insulative housing in a sealing manner, and positioned between the positive electrode sheet and the negative electrode sheet of the lithium-ion battery when the positive electrode sheet and the negative electrode sheet of the lithium-ion battery are received in the receiving chamber, to separate the positive electrode sheet gas region and the negative electrode sheet gas region of the receiving chamber; a positive electrode sheet conductive fastener passing through the insulative housing in a sealing manner and fixedly connected to a positive electrode current collector of the positive electrode sheet of the lithium-ion battery at a positive electrode current collector non-film-coating region, to fix the positive electrode sheet in the receiving chamber of the insulative housing; a negative electrode sheet conductive fastener passing through the insulative housing in a sealing manner and fixedly connected to a negative electrode current collector of the negative electrode sheet of the lithium-ion battery at a negative electrode current collector non-film-coating region, to fix the negative electrode sheet in the receiving chamber of the insulative housing; an insulative cover engaged with the insulative housing and the insulative separator in a sealing manner; and a positive electrode region detection hole provided on the insulative housing and/or the insulative cover in a sealing manner and communicated to the positive electrode sheet gas region; and a negative electrode region detection hole provided on the insulative housing and/or the insulative cover in a sealing manner and communicated to the negative electrode sheet gas region.

The present disclosure has the following beneficial effects:

The detection device for lithium-ion battery of the present disclosure can be adopted to detect various electrolytes and electrode sheets in trial-manufacturing processes, so as to be flexibly applied to detection under various conditions.

The detection device for lithium-ion battery of the present disclosure can be adopted to fix the positive electrode sheet and the negative electrode sheet, sizes of the positive electrode sheet and the negative electrode sheet can be flexibly selected, so as to improve accuracy and convenience of testing.

BRIEF DESCRIPTION OF THE FIGURES

FIG. 8 is a structural schematic diagram of a positive electrode sheet plastic strengthening fastener according to an embodiment;

FIG. 9 is a structural schematic diagram of a negative electrode sheet plastic strengthening fastener according to an embodiment;

FIG. 10 is a structural schematic diagram of a positive electrode sheet;

FIG. 11 is a structural schematic diagram of a negative electrode sheet.

Figure 1:
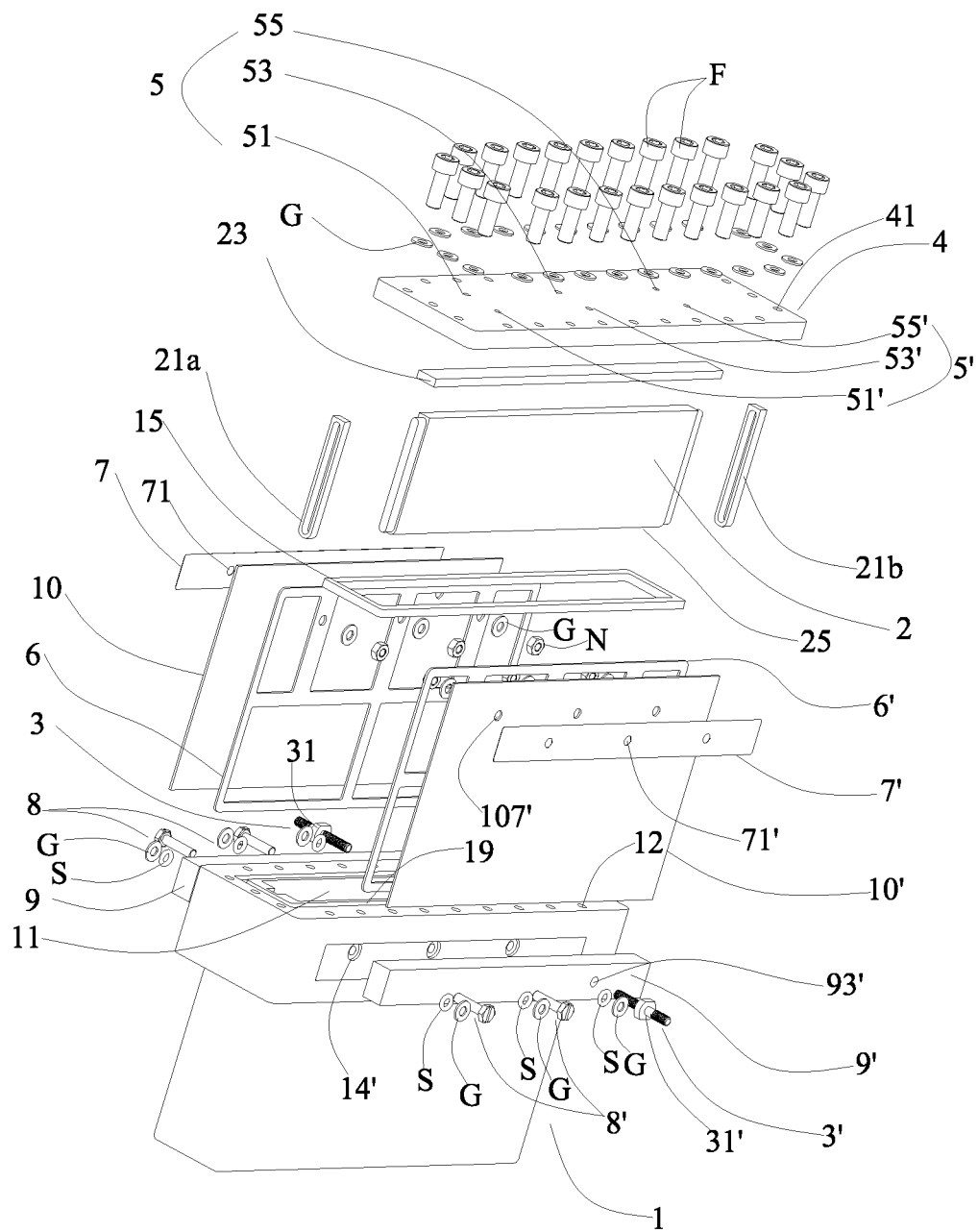
FIG. 1 is an exploded perspective view of the detection device for lithium-ion battery according to the present disclosure.

REFERENCE NUMERALS OF THE EMBODIMENTS ARE REPRESENTED AS FOLLOWS:

1 insulative housing
  11 receiving chamber
    111 positive electrode sheet gas region
    111' negative electrode sheet gas region
  12 hole
  13 positive electrode sheet side housing outer surface 13' negative electrode sheet side housing outer surface
14 through hole
14' through hole
15 housing seal
17a separator side receiving groove
17b separator side receiving groove
19 housing seal receiving groove
2 insulative separator
 21a separator side seal
 21b separator side seal
 23 separator top seal
 25 lower edge portion
3 positive electrode sheet conductive fastener
 31 stopping portion
3' negative electrode sheet conductive fastener
 31' stopping portion
4 insulative cover
 41 through hole
 43 separator top seal receiving groove
5 positive electrode region detection hole
 51 positive electrode region gas pressure detection hole
 53 positive electrode region temperature detection hole
 55 positive electrode region gas extraction hole
5' negative electrode region detection hole
 51' negative electrode region gas pressure detection hole
 53' negative electrode region temperature detection hole
 55' negative electrode region gas extraction hole
6 positive electrode sheet plastic strengthening fastener
 61 liquid hole
 63 through hole
6' negative electrode sheet plastic strengthening fastener
 61' liquid hole
 63' through hole
7 positive electrode sheet conductive plate
 71 through hole
7' negative electrode sheet conductive plate
 71' through hole
8 positive electrode sheet fastener
8' negative electrode sheet fastener
9 positive electrode sheet side insulative cover
 91 outer surface
 93 through hole
9' negative electrode sheet side insulative cover
 91' outer surface
 93 through hole
10 positive electrode sheet
 101 positive electrode current collector
 103 positive electrode current collector film-coating region
 105 positive electrode current collector non-film-coating region
 107 through hole
10' negative electrode sheet
 101' negative electrode current collector
 103' negative electrode current collector film-coating region
 105' negative electrode current collector non-film-coating region
 107' through hole
F fastener
S seal
G gasket
N nut
L electrolyte

DETAILED DESCRIPTION OF THE ILLUSTRATED EMBODIMENTS

Hereinafter a detection device for lithium-ion battery according to the present disclosure will be described in details in combination with the drawings.

As shown in FIG. 1, FIG. 2, FIG. 6, FIG. 10 and FIG. 11, a detection device for lithium-ion battery according to the present disclosure comprises: an insulative housing 1 having a receiving chamber 11 for receiving a positive electrode sheet 10, a negative electrode sheet 10', and an electrolyte L of a lithium-ion battery, the receiving chamber 11 comprises a positive electrode sheet gas region 111 and a negative electrode sheet gas region 111' formed above the electrolyte L; an insulative separator 2 provided in the receiving chamber 11 of the insulative housing 1 in a sealing manner, and positioned between the positive electrode sheet 10 and the negative electrode sheet 10' of the lithium-ion battery when the positive electrode sheet 10 and the negative electrode sheet 10' of the lithium-ion battery are received in the receiving chamber 11, to separate the positive electrode sheet gas region 111 and the negative electrode sheet gas region 111' of the receiving chamber 11; a positive electrode sheet conductive fastener 3 passing through the insulative housing 1 in a sealing manner and fixedly connected to a positive electrode current collector 101 of the positive electrode sheet 10 of the lithium-ion battery at a positive electrode current collector non-film-coating region 105, to fix the positive electrode sheet 10 in the receiving chamber 11 of the insulative housing 1; a negative electrode sheet conductive fastener 3' passing through the insulative housing 1 in a sealing manner and fixedly connected to a negative electrode current collector 101' of the negative electrode sheet 10' of the lithium-ion battery at a negative electrode current collector non-film-coating region 105', to fix the negative electrode sheet 10' in the receiving chamber 11 of the insulative housing 1; an insulative cover 4 engaged with the insulative housing 1 and the insulative separator 2 in a sealing manner; a positive electrode region detection hole 5 provided on the insulative cover 4 in a sealing manner and communicated to the positive electrode sheet gas region 111; and a negative electrode region detection hole 5' provided on the insulative cover 4 in a sealing manner and communicated to the negative electrode sheet gas region 111'. In an alternative embodiment, the positive electrode region detection hole 5 may be provided on the insulative housing 1 in a sealing manner, the negative electrode region detection hole 5' may be provided on the insulative housing 1 in a sealing manner; of course, the positive electrode region detection hole 5 and the negative electrode region detection hole 5' may also be provided on both of the insulative housing 1 and the insulative cover 4.

In the detection device for lithium-ion battery according to the present disclosure, as shown in FIG. 10, the positive electrode sheet 10 comprises the positive electrode current collector 101, the positive electrode current collector 101 is divided into a positive electrode current collector film-coating region 103 and the positive electrode current collector non-film-coating region 105, the positive electrode current collector film-coating region 103 is coated with a positive electrode active material. The positive electrode current collector non-film-coating region 105 is provided with a through hole 107 to allow the positive electrode sheet conductive fastener 3 to pass through. As shown in FIG. 11, the negative electrode sheet 10' comprises the negative electrode current collector 101', the negative electrode current collector 101' is divided into a negative electrode current collector film-coating region 103' and the negative electrode current collector non-film-coating region 105', and the negative electrode current collector film-coating region 103' is coated with a negative electrode active material. The negative electrode current collector non-film-coating region 105' is provided with a through hole 107' to allow the negative electrode sheet conductive fastener 3' to pass through.

In the detection device for lithium-ion battery according to the present disclosure, the positive electrode sheet 10 and the negative electrode sheet 10' may be the same as those to be sold in market actually, so as to improve effectiveness of testing result on practical application.

In the detection device for lithium-ion battery according to the present disclosure, the positive electrode sheet conductive fastener 3 and the negative electrode sheet conductive fastener 3' may be connected to external power cables (not shown), so as to perform a normal charging/discharging testing or an abuse testing (such as overcharge testing, etc) of electrical property on the positive electrode sheet 10 and the negative electrode sheet 10'.

In the detection device for lithium-ion battery according to the present disclosure, the insulative separator 2 separates the positive electrode sheet gas region 111 and the negative electrode sheet gas region 111', so as to facilitate to analyze gas pressures and gas compositions of respective produced gases. A lower edge portion 25 of the insulative separator 2 can be positioned at ½~¾ of a height of the receiving chamber 11. A cross-sectional shape of the insulative separator 2 may be an arbitrary shape, such as a square shape or a trapezoid shape and the like, as long as the above separation can be achieved. In an actual testing, as shown in FIG. 6, a liquid level of the electrolyte L should be higher than the lower edge portion 25 of the insulative separator 2, preferably higher by 1~3 cm.

Figure 4:
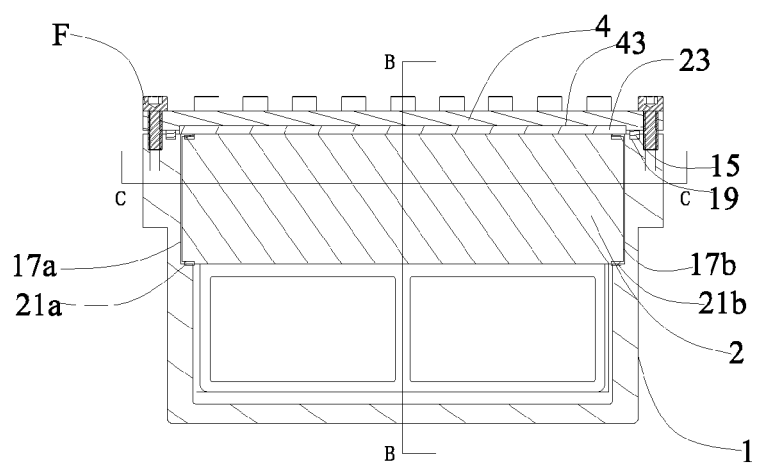
FIG. 4 is a cross-sectional view taken along a center line of FIG. 2.
Figure 6:
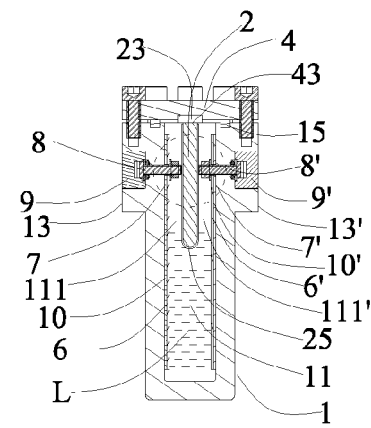
FIG. 6 is a cross-sectional view taken along a line B-B of FIG. 4, in which an electrolyte is shown for clearly showing the provision of an insulative separator.

In the detection device for lithium-ion battery according to the present disclosure, as shown in FIG. 4 and FIG. 6, the insulative housing 1 may be provided with a separator side receiving groove 17a and a separator side receiving groove 17b, the insulative cover 4 may be provided with a separator top seal receiving groove 43, the insulative separator 2 is received in the separator side receiving groove 17a by covering a separator side seal 21 a connected to one side of the insulative separator 2, is received in the separator side receiving groove 17b by covering the separator side seal 21b connected to one side of the insulative separator 2, and is received in the separator top seal receiving groove 43 by covering the separator top seal 23 at top of the insulative separator 2, so as to realize sealed engagement between the insulative separator 2 and the insulative housing 1 and the insulative cover 4.

In the detection device for lithium-ion battery according to the present disclosure, as shown in FIG. 1 and FIG. 4, the insulative housing 1 may be provided with a housing seal receiving groove 19, a housing seal 15 is received in the housing seal receiving groove 19, by which the housing seal 15 abuts against the insulative cover 4 to realize sealing between the insulative cover 4 and the insulative housing 1. The housing seal 15 may be a silicone rubber seal. As shown in FIG. 1, fixation between the insulative cover 4 and the insulative housing 1 may be realized by a fastener F. The fastener F can be an inner hexagon screw, a material of the inner hexagon screw is preferably stainless steel. The fastener F passes through the through hole 41 of the insulative cover 4 and enters into the hole 12 of the insulative housing 1, so as to fix the insulative cover 4 on the insulative housing 1. In addition, for strengthening the fixation, the fastener F may be matched with a gasket G, the gasket G is preferably a stainless steel flat washer.

In the detection device for lithium-ion battery according to the present disclosure, as shown in FIG. 1, the positive electrode sheet conductive fastener 3 and the negative electrode sheet conductive fastener 3' may adopt studs, the sealing thereof may adopt seals S, the seal S preferably adopts an O-ring seal. In addition for strengthening tightness, a gasket G may be correspondingly adopted, the gasket G preferably adopts a stainless steel flat washer.

As shown in FIG. 1, in the detection device for lithium-ion battery according to the present disclosure, the insulative separator 2 is a separate piece engaged with the insulative housing 1 and the insulative cover 3 in a sealing manner, by that the insulative separator 2 is provided as a separate piece, a volume of the receiving chamber 11 of the insulative housing 1 may be reduced sufficiently based on an assembling process, to further minimize the detection device for lithium-ion battery. Alternatively, the insulative separator 2 and the insulative housing 1 may be integral, so as to simplify a manufacturing process of the detection device for lithium-ion battery.

Figure 3:
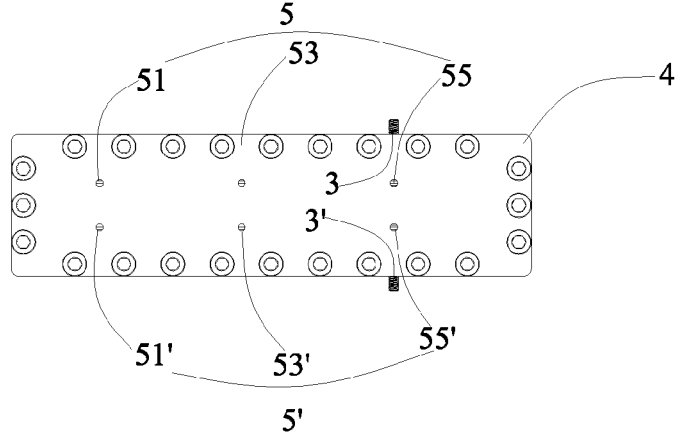
FIG. 3 is a top view of FIG. 2.

As shown in FIG. 1 and FIG. 3, in the detection device for lithium-ion battery according to the present disclosure, preferably, the positive electrode region detection hole 5 comprises: a positive electrode region gas pressure detection hole 51 communicated to the positive electrode sheet gas region 111 for allowing a barometer (not shown) to pass through in a sealing manner, so as to detect a gas pressure of the positive electrode sheet gas region 111; and a positive electrode region temperature detection hole 53 communicated to the positive electrode sheet gas region 111 for allowing a thermometer (not shown) to pass through in a sealing manner, so as to detect a temperature of the positive electrode sheet gas region 111. Preferably, the negative electrode region detection hole 5' comprises: a negative electrode region gas pressure detection hole 51' communicated to the negative electrode sheet gas region 111' for allowing a barometer (not shown)to pass through in a sealing manner, so as to detect a gas pressure of the negative electrode sheet gas region 111'; and a negative electrode region temperature detection hole 53' communicated to the negative electrode sheet gas region 111' for allowing a thermometer (not shown)to pass through in a sealing manner, so as to detect a temperature of the negative electrode sheet gas region 111'. More preferably, the positive electrode region detection hole 5 further comprises: a positive electrode region gas extraction hole 55 communicated to the positive electrode sheet gas region 111 for extracting a gas of the positive electrode sheet gas region 111. More preferably, the negative electrode region detection hole 5' further comprises: a negative electrode region gas extraction hole 55' communicated to the negative electrode sheet gas region 111' for extracting a gas of the negative electrode sheet gas region 111'. The positive electrode region gas extraction hole 55 and the negative electrode region gas extraction hole 55' are used for vacuumizing and sealing the positive electrode sheet gas region 111 and the negative electrode sheet gas region 111', by which the produced gas is extracted to perform gas composition analysis in later period. When these six detection holes are jointly arranged, the six detection holes can be arranged symmetrically and uniformly along a length direction and a width direction of the insulative cover 4.

As shown in FIG. 1, FIG. 5, FIG. 6, FIG. 7, FIG. 8 and FIG. 9, in the detection device for lithium-ion battery according to the present disclosure, preferably, the detection device for lithium-ion battery can further comprise: a positive electrode sheet plastic strengthening fastener 6 fixedly connected to a side of the positive electrode sheet 10 of the lithium-ion battery facing the insulative separator 2 via the positive electrode sheet conductive fastener 3; and a negative electrode sheet plastic strengthening fastener 6' fixedly connected to a side of the negative electrode sheet 10' of lithium-ion battery facing the insulative separator 2 via the negative electrode sheet conductive fastener 3'. The positive electrode sheet plastic strengthening fastener 6 and the negative electrode sheet plastic strengthening fastener 6' respectively plays a role of strengthening fixation of the positive electrode sheet 10 and the negative electrode sheet 10', to prevent falling of the electrode sheets due to chemical reactions of the positive electrode sheet 10 and the negative electrode sheet 10' which are always immersed in the electrolyte L. More preferably, the positive electrode sheet plastic strengthening fastener 6 has a liquid hole 61 provided thereon and communicated to the electrolyte L added in the receiving chamber 11. More preferably, the negative electrode sheet plastic strengthening fastener 6' has a liquid hole 61' provided thereon and communicated to the electrolyte L added in the receiving chamber 11. The provision of the liquid hole 61 and the liquid hole 61' respectively facilitate the positive electrode current collector film-coating region 103' and the negative electrode current collector film-coating region 103' to directly contact with the electrolyte L, so as to facilitate electrochemical reaction. The positive electrode sheet plastic strengthening fastener 6 and the negative electrode sheet plastic strengthening fastener 6' may be selected from polypropylene (PP) plastic, polyphenylene sulfide (PPS) plastic, and polyethylene glycol terephthalate (PET) Mylar. In FIG. 1, the positive electrode sheet plastic strengthening fastener 6 and the negative electrode sheet plastic strengthening fastener 6' have the same structure. And in FIG. 8 and FIG. 9, the positive electrode sheet plastic strengthening fastener 6 and the negative electrode sheet plastic strengthening fastener 6' have different structures, which are mainly represented by shape differences between the liquid hole 61 and the liquid hole 61'. The positive electrode sheet plastic strengthening fastener 6 may be realized as being fixedly connected to the positive electrode sheet 10 of the lithium-ion battery by using a provided through hole 63 (as shown in FIG. 8) through which the positive electrode sheet conductive fastener 3 passes. The negative electrode sheet plastic strengthening fastener 6' may be realized as being fixedly connected to the negative electrode sheet 10' of the lithium-ion battery by using a provided through hole 63'(as shown in FIG. 9) through which the negative electrode sheet conductive fastener 3' passes.

Figure 7:
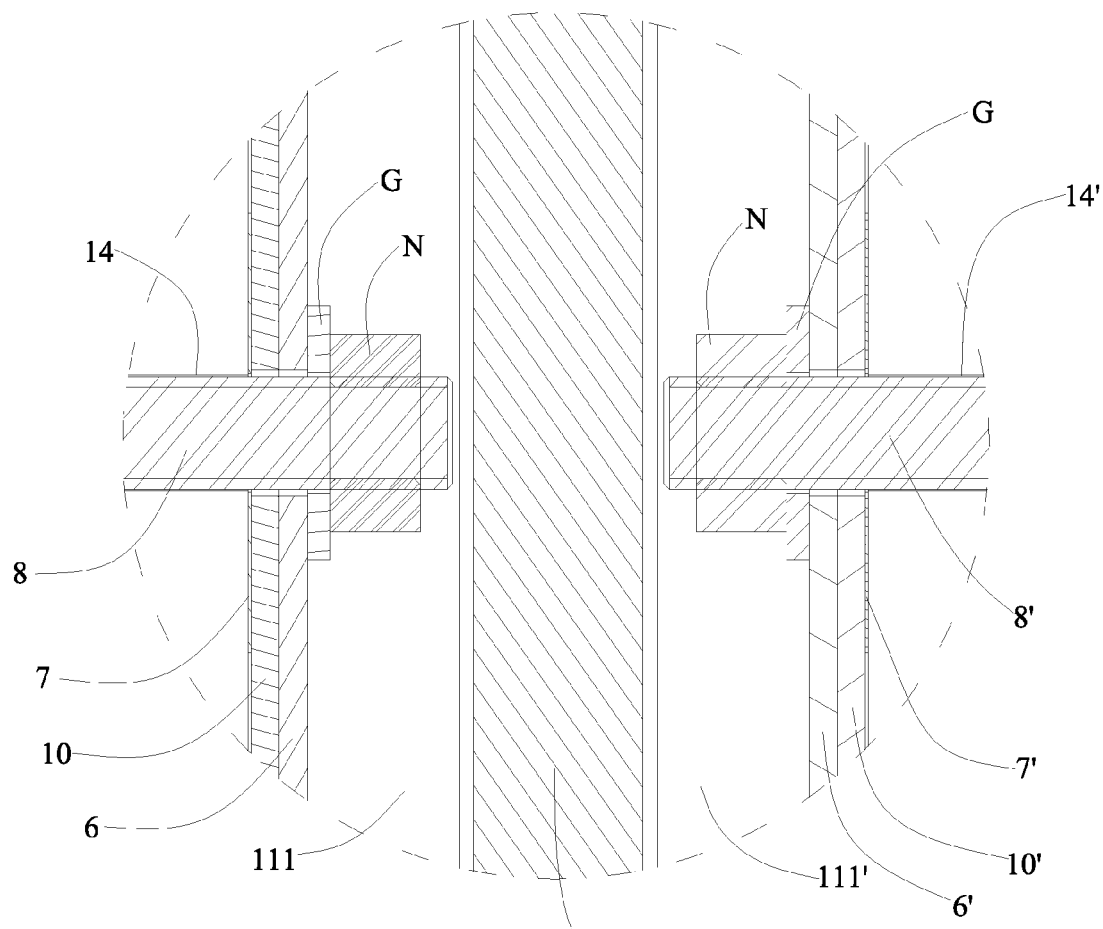
FIG. 7 is a partial enlarged view of FIG. 6.

As shown in FIG. 1, FIG. 6 and FIG. 7, in the detection device for lithium-ion battery according to the present disclosure, preferably, the detection device for lithium-ion battery may further comprise: a positive electrode sheet conductive plate 7 fixedly connected to the positive electrode current collector 101 of the positive electrode sheet 10 of the lithium-ion battery at the positive electrode current collector non-film-coating region 105 and facing the insulative housing 1 via the positive electrode sheet conductive fastener 3; and a negative electrode sheet conductive plate 7' fixedly connected to the negative electrode current collector 101' of the negative electrode sheet 10' of the lithium-ion battery at the negative electrode current collector non-film-coating region 105' and facing the insulative housing 1 via the negative electrode sheet conductive fastener 3'. The positive electrode sheet conductive plate 7 contacts with the positive electrode current collector 101 at the positive electrode current collector non-film-coating region 105 and the negative electrode sheet conductive plate 7' contacts with the negative electrode current collector 101' at the negative electrode current collector non-film-coating region 105', to facilitate respective electric conduction, at the same time to correspondingly avoid the positive electrode current collector film-coating region 103 and the negative electrode current collector film-coating region 103' from contacting with an inner wall of the insulative housing 1 to cause damage. More preferably, the positive electrode sheet conductive plate 7 is covered by the positive electrode current collector 101 of the positive electrode sheet 10 of the lithium-ion battery at the positive electrode current collector non-film-coating region 105 and facing the insulative housing 1, so as to facilitate provision and fixation of the positive electrode sheet conductive plate 7. More preferably, the negative electrode sheet conductive plate 7' is covered by the negative electrode current collector 101' of the negative electrode sheet 10' of the lithium-ion battery at the negative electrode current collector non-film-coating region 105' and facing the insulative housing 1 so as to facilitate provision and fixation of the negative electrode sheet conductive plate 7'. The positive electrode sheet conductive plate 7 and the negative electrode sheet conductive plate 7' are preferably metal sheets, more preferably copper sheets, so as to ensure electrical conductivity, of course may be composite metal sheets which are formed by plating other metal materials (such as nickel, tin and gold and the like) on the copper sheets. In the present disclosure, the positive electrode sheet conductive plate 7 is provided with a through hole 71 to allow the positive electrode sheet conductive fastener 3 to pass through. When a positive electrode sheet fastener 8 described later is further adopted, the positive electrode sheet conductive plate 7 is correspondingly provided with another through hole 71 to allow the positive electrode sheet fastener 8 to pass through. The negative electrode sheet conductive plate 7' is provided with a through hole 71' to allow the negative electrode sheet conductive fastener 3' to pass through. When a negative electrode sheet fastener 8' described later is further adopted, the negative electrode sheet conductive plate 7' is correspondingly provided with another through hole 71' to allow the negative electrode sheet fastener 8' to pass through.

Figure 5:
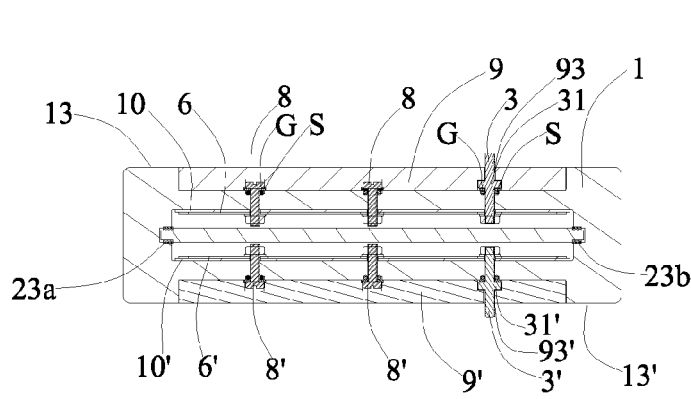
FIG. 5 is a cross-sectional view taken along a line C-C of FIG. 4.

In the detection device for lithium-ion battery according to the present disclosure, preferably, as shown in FIG. 1, FIG. 5, FIG. 6 and FIG. 7, the detection device for lithium-ion battery may further comprise: the positive electrode sheet fastener 8 passing through the insulative housing 1 in a sealing manner and fixedly connected to the positive electrode current collector 101 of the positive electrode sheet 10 of the lithium-ion battery at the positive electrode current collector non-film-coating region 105; and the negative electrode sheet fastener 8' passing through the insulative housing 1 in a sealing manner and fixedly connected to the negative electrode current collector 101' of the negative electrode sheet 10' of the lithium-ion battery at the negative electrode current collector non-film-coating region 105'. The provision of the positive electrode sheet fastener 8 and the negative electrode sheet fastener 8' respectively facilitate to correspondingly further keep the positive electrode sheet 10 and the negative electrode sheet 10' to be fixed in the receiving chamber 11 of the insulative housing 1. The positive electrode sheet fastener 8 and the negative electrode sheet fastener 8' are respectively provided as two in number in FIG. 1, but not limited to that, and may be provided according to actual requirements. The positive electrode sheet fastener 8 and the negative electrode sheet fastener 8' may adopt bolts matched with nuts N to realize fixed connection, the bolt can adopt a hexagon head bolt with a slot at the head part, the nut N may adopt a hexagon thin nut. More preferably, as shown in FIG. 1, FIG. 2, FIG. 5 and FIG. 6, the detection device for lithium-ion battery may further comprise: a positive electrode sheet side insulative cover 9 recessed in the insulative housing 1 and covering the positive electrode sheet fastener 8 and a stopping portion 31 of the positive electrode sheet conductive fastener 3; and a negative electrode sheet side insulative cover 9' recessed in the insulative housing 1 and covering the negative electrode sheet fastener 8' and a stopping portion 31' of the negative electrode sheet conductive fastener 3', so as to reduce possibility of electrical leakage. As shown in FIG. 1 and FIG. 5, the positive electrode sheet conductive fastener 3 passes through the through hole 91 to extend to outside, the negative electrode sheet conductive fastener 3' passes through the through hole 91' to extend to outside. Further preferably, as shown in FIG. 5 and FIG. 6, when the positive electrode sheet side insulative cover 9 is recessed in the insulative housing 1, an outer surface 91 of the positive electrode sheet side insulative cover 9 is flush with a positive electrode sheet side housing outer surface 13 of the insulative housing 1; and when the negative electrode sheet side insulative cover 9' is recessed in the insulative housing 1, an outer surface 91' of the negative electrode sheet side insulative cover 9' is flush with a negative electrode sheet side housing outer surface 13' of the insulative housing 1, so as to improve aesthetic appearance. In the present disclosure, the positive electrode sheet fastener 8 may pass through the insulative housing 1 via the through hole 14. The negative electrode sheet fastener 8' may pass through the insulative housing 1 via the through hole 14'.

In the detection device for lithium-ion battery according to the present disclosure, preferably, the insulative housing 1, the insulative separator 2, and the insulative cover 3 are transparent plastics, to allow the detection device for lithium-ion battery to be a transparent device, so as to on-line observe the positive electrode sheet 10, the negative electrode sheet 10', the electrolyte L and the produced gas in real time in the charging/discharging process of the lithium-ion battery, monitor appearance changes of the positive electrode sheet 10 and the negative electrode sheet 10', and facilitate to adopt a thermal infrared imager to observe temperature changes of the positive electrode sheet 10 and the negative electrode sheet 10'. More preferably, the positive electrode sheet side insulative cover 9 and the negative electrode sheet side insulative cover 9' are transparent plastics, so as to further strengthen transparency of the detection device for lithium-ion battery. The transparent plastics may be selected from any one of polypropylene (PP) plastic, polyphenylene sulfide (PPS) plastic, and polymethyl methacrylate plastic, these materials are electrolyte resistance and gas pressure resistance.

Figure 2:
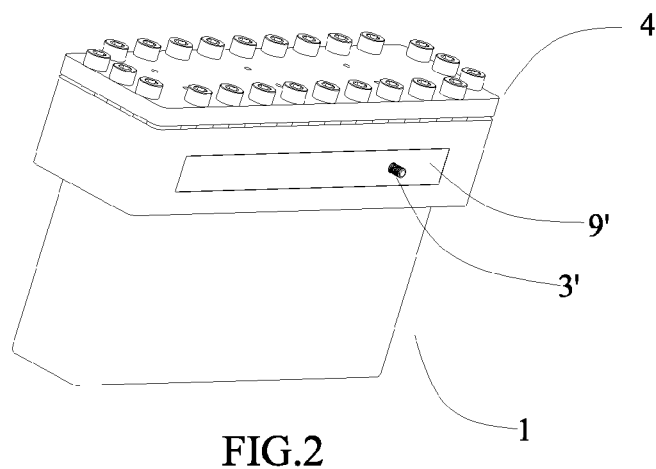
FIG. 2 is an assembled perspective view of the detection device for lithium-ion battery according to the present disclosure.

In the detection device for lithium-ion battery according to the present disclosure, the detection device for lithium-ion battery may be a square shape after assembling, as shown in FIG. 2.

In the detection device for lithium-ion battery according to the present disclosure, all of the housing seal 15, the separator side seal 21*a*, the separator side seal 21*b*, the separator top seal 23, and the seal S may be classified as a sealing mechanism.

In the detection device for lithium-ion battery according to the present disclosure, the through hole 14', the through hole 71', the through hole 107', and the through hole 63' are correspondingly aligned when the detection device for lithium-ion battery are assembled, which is also suitable for the through hole 93'; the through hole 14, the through hole 71, the through hole 107, and the through hole 63 are correspondingly aligned when the detection device for lithium-ion battery are assembled, which is also suitable for the through hole 93.

The detection device for lithium-ion battery according to the present disclosure can be applied to other types of batteries and non-battery electric devices (such as supercapacitors) which are similar to the lithium-ion battery structure for testing above properties. These all belong to equivalents of the present disclosure and are fallen within the protection range of the present disclosure.

What is claimed is:

1. A detection device for lithium-ion battery, comprising:
   an insulative housing having a receiving chamber for receiving a positive electrode sheet, a negative electrode sheet, and an electrolyte of a lithium-ion battery, the receiving chamber comprising a positive electrode sheet gas region and a negative electrode sheet gas region formed above the electrolyte;
   an insulative separator provided in the receiving chamber of the insulative housing in a sealing manner, and positioned between the positive electrode sheet and the negative electrode sheet of the lithium-ion battery when the positive electrode sheet and the negative electrode sheet of the lithium-ion battery are received in the receiving chamber, to separate the positive electrode sheet gas region and the negative electrode sheet gas region of the receiving chamber;
   a positive electrode sheet conductive fastener passing through the insulative housing in a sealing manner and fixedly connected to a positive electrode current collector of the positive electrode sheet of the lithium-ion battery at a positive electrode current collector non-film-coating region, to fix the positive electrode sheet in the receiving chamber of the insulative housing;
   a negative electrode sheet conductive fastener passing through the insulative housing in a sealing manner and fixedly connected to a negative electrode current collector of the negative electrode sheet of the lithium-ion battery at a negative electrode current collector non-film-coating region, to fix the negative electrode sheet in the receiving chamber of the insulative housing;
   an insulative cover engaged with the insulative housing and the insulative separator in a sealing manner; and
   a positive electrode region detection hole provided on the insulative housing and/or the insulative cover in a sealing manner and communicated to the positive electrode sheet gas region; and
   a negative electrode region detection hole provided on the insulative housing and/or the insulative cover in a sealing manner and communicated to the negative electrode sheet gas region;
   wherein
   the positive electrode region detection hole comprises:
      a positive electrode region gas pressure detection hole communicated to the positive electrode sheet gas region for allowing a barometer to pass through in a sealing manner, so as to detect a gas pressure of the positive electrode sheet gas region; and
      a positive electrode region temperature detection hole communicated to the positive electrode sheet gas region for allowing a thermometer to pass through in a sealing manner, so as to detect a temperature of the positive electrode sheet gas region;

the negative electrode region detection hole comprises:

a negative electrode region gas pressure detection hole communicated to the negative electrode sheet gas region for allowing a barometer to pass through in a sealing manner, so as to detect a gas pressure of the negative electrode sheet gas region; and a negative electrode region temperature detection hole communicated to the negative electrode sheet gas region for allowing a thermometer to pass through in a sealing manner, so as to detect a temperature of the negative electrode sheet gas region.

2. The detection device for lithium-ion battery according to claim 1, wherein the positive electrode region detection hole further comprises: a positive electrode region gas extraction hole communicated to the positive electrode sheet gas region for extracting a gas of the positive electrode sheet gas region; and the negative electrode region detection hole further comprises: a negative electrode region gas extraction hole communicated to the negative electrode sheet gas region for extracting a gas of the negative electrode sheet gas region.

3. The detection device for lithium-ion battery according to claim 1, further comprising:

a positive electrode sheet plastic strengthening fastener fixedly connected to a side of the positive electrode sheet of the lithium-ion battery facing the insulative separator via the positive electrode sheet conductive fastener; and a negative electrode sheet plastic strengthening fastener fixedly connected to a side of the negative electrode sheet of lithium-ion battery facing the insulative separator via the negative electrode sheet conductive fastener.

4. The detection device for lithium-ion battery according to claim 3, wherein the positive electrode sheet plastic strengthening fastener has a liquid hole provided thereon and communicated to the electrolyte added in the receiving chamber; and the negative electrode sheet plastic strengthening fastener has a liquid hole provided thereon and communicated to the electrolyte added in the receiving chamber.

5. The detection device for lithium-ion battery according to claim 3, further comprising:

a positive electrode sheet conductive plate fixedly connected to the positive electrode current collector of the positive electrode sheet of the lithium-ion battery at the positive electrode current collector non-film-coating region and facing the insulative housing via the positive electrode sheet conductive fastener; and a negative electrode sheet conductive plate fixedly connected to the negative electrode current collector of the negative electrode sheet of the lithium-ion battery at the negative electrode current collector non-film-coating region and facing the insulative housing via the negative electrode sheet conductive fastener.

6. The detection device for lithium-ion battery according to claim 5, wherein the positive electrode sheet conductive plate is covered by the positive electrode current collector of the positive electrode sheet of the lithium-ion battery at the positive electrode current collector non-film-coating region and facing the insulative housing; and the negative electrode sheet conductive plate is covered by the negative electrode current collector of the negative electrode sheet of the lithium-ion battery at the negative electrode current collector non-film-coating region and facing the insulative housing.

7. The detection device for lithium-ion battery according to claim 1, further comprising:

a positive electrode sheet fastener passing through the insulative housing in a sealing manner and fixedly connected to the positive electrode current collector of the positive electrode sheet of the lithium-ion battery at the positive electrode current collector non-film-coating region; and a negative electrode sheet fastener passing through the insulative housing in a sealing manner and fixedly connected to the negative electrode current collector of the negative electrode sheet of the lithium-ion battery at the negative electrode current collector non-film-coating region.

8. The detection device for lithium-ion battery according to claim 7, further comprising:

a positive electrode sheet side insulative cover recessed in the insulative housing and covering the positive electrode sheet fastener and a stopping portion of the positive electrode sheet conductive fastener; and a negative electrode sheet side insulative cover recessed in the insulative housing and covering the negative electrode sheet fastener and a stopping portion of the negative electrode sheet conductive fastener.

9. The detection device for lithium-ion battery according to claim 8, wherein when the positive electrode sheet side insulative cover is recessed in the insulative housing, an outer surface of the positive electrode sheet side insulative cover is flush with an positive electrode sheet side housing outer surface of the insulative housing; and when the negative electrode sheet side insulative cover is recessed in the insulative housing, an outer surface of the negative electrode sheet side insulative cover is flush with a negative electrode sheet side housing outer surface of the insulative housing.

10. The detection device for lithium-ion battery according to claim 1, wherein the insulative housing, the insulative separator, and the insulative cover are transparent plastics.

11. The detection device for lithium-ion battery according to claim 8, wherein the positive electrode sheet side insulative cover and the negative electrode sheet side insulative cover are transparent plastics.

* * * * *